March 19, 1968     L. UNGER     3,373,690

ELECTRICALLY DRIVEN POWER PUMP

Filed Aug. 1, 1966

INVENTOR:

LADISLAUS UNGER

BY

ATTORNEY.

United States Patent Office 3,373,690
Patented Mar. 19, 1968

3,373,690
ELECTRICALLY DRIVEN POWER PUMP
Ladislaus Unger, Malsch, Kreis Karlsruhe, Germany, assignor to Otto Eckerle, Malsch, Kreis Karlsruhe, Germany
Filed Aug. 1, 1966, Ser. No. 569,347
Claims priority, application Germany, July 30, 1965, E 29,810
8 Claims. (Cl. 103—87)

The invention relates to an electric pump for liquid or gaseous substances. The electric pump comprises an electric motor whose stator carries in its yoke a pipe containing the rotor and defining therewith a passage for conveyed medium. The pipe is tightly closed off on both sides by respectively one cap.

In summary, the apparatus of this invention is an electrically driven pump for liquid or gaseous fluids comprising an electric motor having a stator with a pipe positioned within the stator yoke. A motor rotor is mounted concentrically within the pipe and is axially displaceable therein. The rotor and pipe define a fluid passageway therebetween, and each end of the pipe is closed with a cap means. A positive displacement rotary pump means is positioned between one end of the rotor and the cap means respective thereto. The rotary pump means comprises a pump sealing surface mounted on the rotor for rotation therewith with a pump rotor means fixedly attached thereto, and a stationary pump element attached to the respective cap means and positioned for pumping cooperation with the pump rotor means.

It is the object of this invention to provide an electric pump which comprises a motor and pump in a single housing which has a long operating life and which will deliver high fluid pressures and draw substantial vacuums.

Power pumps of this type wherein the rotor of the electric motor drives an impeller are known. Although such pumps can convey large quantities, they operate in an almost pressureless manner. The electric pump of this invention provides high and extremely high outlet pressures, pulls an inherent inlet vacuum, and is self compensating for wear. The construction of the power pump is simplified because the drive portion and the pumping portion are a single unit, parts of the electric motor or parts of the housing serving simultaneously as pump elements, and vice versa.

According to the invention, one or several rotary positive-displacement pumps are provided in the slotted pipe between one or both front faces of the axially displaceably mounted rotor and the respective cap. At the respective front face of the rotor is a sealed pump surface connected with the pump rotor, the stationary pump element pertaining thereto forming part of the cap or being attached to the cap. For this purpose, all conventional positive-displacement pumps are suitable, such as, for example, roller rotary pumps, rotary blade pumps, gear pumps, etc.

Preferably, the rotor of the electric motor is fashioned in such a manner that its front face forms the pump sealing surface and the pump rotor. In accordance with a particularly preferred embodiment, the rotor is floatingly provided in the slotted pipe, without a shaft.

Since the pressure of the conveyed medium, during the operation of the power pump, forces the rotor with the pump sealing surface against the stationary pump element, the working space of the pump is sealed. The rotating pump sealing surface provides uniform wear so that no leaking spaces can occur, assuring a long operating life for the pump. The initial sealing of the pump, required for the start-up of the pump, is obtained by exerting an axially directed electromagnetic or mechanical force upon the rotor, pressing the rotor against the pump. The pressure of the conveyed medium flowing through the slotted pipe cools the electric motor and centers the shaftless rotor, or relieves the bearing sites from loads if the rotor is provided with a shaft.

The present invention will be explained in greater detail with reference to the following drawings which illustrate an embodiment of the proposed power pump, wherein.

Figure 1:
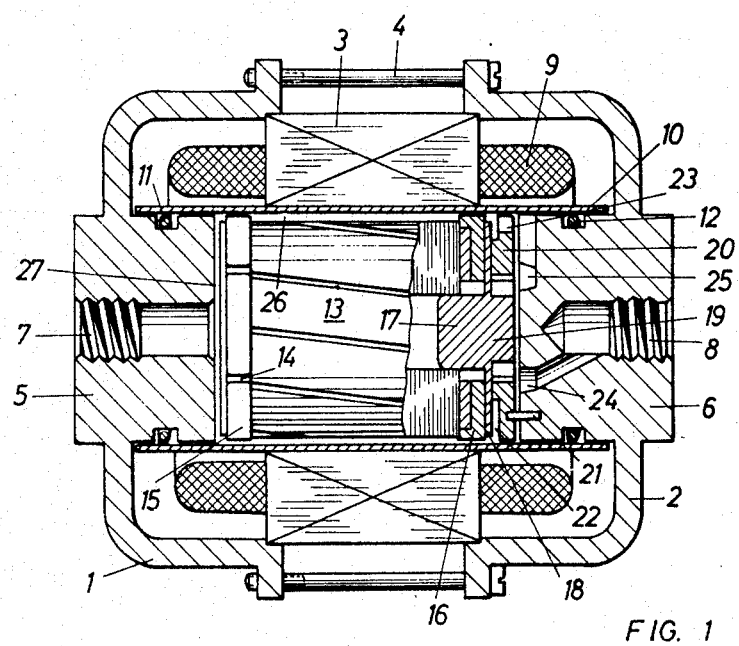
FIG. 1 is a longitudinal cross-sectional view of the electric pump.

Referring to the figures, the motor housing consists of two shell-shaped caps 1 and 2 supported on the stator 3 of the electric motor and connected with each other by means of a screw bolt 4. Each of the caps (lids) 1 and 2, respectively, is provided with an axial, cylindrical terminal body 5 and 6, respectively, there being present in the terminal body 5 a threaded bore 7 for connecting the pressure line, and in the terminal body 6 a threaded bore 8 for connecting the vacuum line.

The stator 3 carries, in addition to the electrical winding 9, a pressure-resistant slotted pipe 10 in its yoke, this pipe being pushed onto the terminal bodies 5 and 6 on both sides and being sealed by means of sealing rings 11 and 12. The rotor 13 of the electric motor is provided within the slotted pipe. At the front faces of the rotor 13, respectively, one projecting ring 15 and 16, provided with grooves 14, is arranged; the outer diameter of such ring is somewhat smaller than the internal diameter of the slotted pipe 10, so that an annular slot is formed.

Referring to FIG. 1, on one side, a pin or trunnion, 17 is inserted in the rotor 13, this pin carrying a disk 18 and the pump rotor 19. These three parts can be made of one piece. The stationary pump element 20 is slidingly supported on the disk 18 and is fixedly supported on the terminal body 6 with the aid of a lug 21. A recess 22 is provided in the stationary pump element 20, opposite to the disk 18, serving as a pressure area and being opposed to the axial compression of the disk 18 or the rotor 13. At the upper rim of the pump element 20, a passageway 23 is provided through which the conveyed medium passes. On the front side facing the pump, there are arranged in the terminal body 6 a suction pocket 23 connected with the threaded bore 8, and a pressure pocket 25 connected with the passageway 23.

Even though, in the above-mentioned embodiment, the rotor 13 is floatingly mounted and displaceable in the slotted pipe 10, this rotor can also be mounted in the terminal caps 5 and 6 with the aid of one or two trunnions or one shaft extending axially therethrough. However, the rotor must always be axially displaceable.

Figure 2:
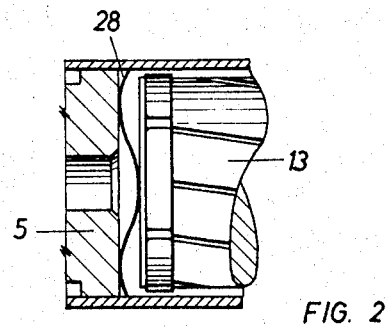
FIG. 2 is a partial longitudinal cross-sectional view of an alternative construction with a compression spring for urging the rotor against the working surface of the pump element.

As shown in FIG. 1 of the drawing, the rotor 13 is offset somewhat to the left with respect to the stator 3. Upon start-up of the power pump, the thus-produced magnetic force exerts an axial thrust effect upon the rotor 13 in the direction of the pump, whereby the disk 18 is pressed against the stationary pump element 20, and the latter is pressed against the terminal body 6, whereby the working space of the pump is maintained sealed. The same effect can be achieved by providing a compression spring 28 (see FIG. 2) between the terminal body 5 and the rotor 13.

During the rest period, or during the pressureless start-up of the power pump, the rotor 13 is centered in the slotted pipe 10 by the rings 15 and 16. Once the power pump is set into operation, the pump draws in the conveyed medium via the threaded bore 8 and the suction pocket 24 and forcedly conveys this medium via the pressure pocket 25, and passageway 23, and the annular slot 26 to the threaded bore 7 in the terminal body 5. In the space 27 between the terminal body 5 and the rotor 13, a pressure area is built up which, in turn, presses the rotor 13 and the disk 18 against the pump and seals the latter. Since the total area of the pressure zone in the space 27 is large, and an excessively high pressure per unit area would arise between the disk 18 and the pump element 20, the pump element 20 is also provided with the above-mentioned recess 22 wherein likewise a pressure area is built up opposed to the pressure zone in the space 27. This reduces the total axial pressure of the rotor 13 to the magnitude necessary for sealing the working space of the pump.

The pressure of the conveyed medium flowing through the annular slot 26 in the slotted pipe 10 floats the rotor 13 in a centered position. The grooves 14 in the rings 15 and 16 of the rotor 13 serve to decrease the flow resistance through the annular slot 26.

Obviously, many modifications and variations of the invention as hereinabove set forth can be made without departing from the essence and scope thereof, and only such modifications should be made as are indicated in the claims.

I claim:

1. An electrically driven pump for liquid or gaseous fluids comprising an electric motor having a stator, a pipe positioned within the stator yoke, a rotor positioned concentrically within the pipe and axially displaceable therein, the rotor and pipe defining a fluid passageway therebetween, each end of the pipe being closed with a cap means, a positive displacement rotary pump means being positioned between one end of the rotor and the cap means respective thereto, the rotary pump means comprising a pump sealing surface mounted on the rotor for rotation therewith with a pump rotor means fixedly attached thereto, and a stationary pump element attached to the respective cap means and positioned for pumping cooperation with the pump rotor means.

2. The electrically driven pump of claim 1 wherein the front face of the rotor constitutes the sealing surface of the pump.

3. The electrically driven pump of claim 1 wherein the pump means comprises a pin inserted in the rotor, the pump sealing surface and pump rotor means including a disc carried on the pin and integral therewith.

4. The electrically driven pump of claim 1 wherein the rotor is floatingly mounted in the pipe and is provided, adjacent the end faces, with respective projecting annular rings which constitute auxiliary bearings, each ring having longitudinal grooves therein, the outer diameter of the rings being somewhat smaller than the internal diameter of the pipe.

5. The electrically driven pump of claim 4 wherein the rotor is offset from the magnetic center of the stator in a direction away from the pump whereby a thrusting force is effective upon the pump.

6. The electrically driven pump of claim 4 comprising a compression spring between the face of the rotor and the cap on the end thereof opposite the pump whereby a thrusting force is effective upon the pump.

7. The electrically driven pump of claim 4 wherein cap on the end of the rotor opposite the rotary pump means includes a bore communicating with the interior of the pipe for withdrawing the conveyed fluid from the pump.

8. The electrically driven pump of claim 4 wherein the stationary pump element defines with the pump rotor an annular recess means communicating with the pressure side of the rotary pump means for providing a balancing pressure to offset pressures against the rotor by the pressurized fluid at the outlet end of the pipe.

References Cited
UNITED STATES PATENTS

| | | | |
|---|---|---|---|
| 1,819,228 | 8/1931 | Coates | 310—61 XR |
| 2,958,296 | 11/1960 | Carter | 103—87 |

ROBERT M. WALKER, *Primary Examiner.*